US009753596B2

(12) United States Patent
Aoki et al.

(10) Patent No.: US 9,753,596 B2
(45) Date of Patent: Sep. 5, 2017

(54) DISPLAY DEVICE WITH DISPLAY OF COMPLEMENTARY PORTION BETWEEN DARK PORTION AND BRIGHT PORTION

(71) Applicant: Japan Display Inc., Tokyo (JP)

(72) Inventors: Shigenori Aoki, Tokyo (JP); Tsutomu Harada, Tokyo (JP)

(73) Assignee: Japan Display Inc., Tokyo (JP)

( * ) Notice: Subject to any disclaimer, the term of this patent is extended or adjusted under 35 U.S.C. 154(b) by 159 days.

(21) Appl. No.: 14/821,383

(22) Filed: Aug. 7, 2015

(65) Prior Publication Data

US 2016/0093255 A1 Mar. 31, 2016

(30) Foreign Application Priority Data

Sep. 29, 2014 (JP) .................................. 2014-198888
May 5, 2015 (JP) .................................. 2015-154693

(51) Int. Cl.
*G06F 3/044* (2006.01)
*G09G 3/34* (2006.01)
(Continued)

(52) U.S. Cl.
CPC ............ *G06F 3/044* (2013.01); *G02B 6/0011* (2013.01); *G02F 1/13471* (2013.01); *G06F 3/0412* (2013.01); *G06F 3/0416* (2013.01); *G09G 3/3426* (2013.01); *G02F 2001/133601* (2013.01); *G06F 2203/04103* (2013.01); *G06F 2203/04108* (2013.01);
(Continued)

(58) Field of Classification Search
CPC ...... G06F 3/0412; G06F 3/0416; G06F 3/044; G06F 2203/04103; G06F 2203/04108; G09G 3/3426; G09G 2300/023; G09G 2320/066; G09G 2320/0686; G02F 1/13471; G02F 2001/133601; G02B 6/0011
See application file for complete search history.

(56) References Cited

U.S. PATENT DOCUMENTS

2007/0159449 A1 7/2007 Yoo et al.
2009/0303170 A1 12/2009 Chung et al.
(Continued)

FOREIGN PATENT DOCUMENTS

JP 2007-183639 A 7/2007
JP 2009-294637 A 12/2009
(Continued)

*Primary Examiner* — Larry Sternbane
(74) *Attorney, Agent, or Firm* — Michael Best & Friedrich LLP

(57) ABSTRACT

A display device is disclosed. In one embodiment, it includes a light source, a light guide including an entrance surface facing the light source and an exit surface from which light incident on the entrance surface exits, and a display panel including a display area in which a plurality of display pixels are arranged, with the display area facing the exit surface. The display panel is configured to selectively transmit light incident on the display area for displaying an image in the display area by driving the display pixels. A dimming panel including a dimming area faces the display area and the exit surface, and is configured to change a transmittance of light incident on the dimming area for each portion in the dimming area.

10 Claims, 12 Drawing Sheets

(51) Int. Cl.
*G02F 1/1347* (2006.01)
*G06F 3/041* (2006.01)
*F21V 8/00* (2006.01)
*G02F 1/1335* (2006.01)

(52) U.S. Cl.
CPC . *G09G 2300/023* (2013.01); *G09G 2320/066* (2013.01); *G09G 2320/0686* (2013.01)

(56) References Cited

U.S. PATENT DOCUMENTS

| | | | |
|---|---|---|---|
| 2010/0253882 A1 | 10/2010 | Han et al. | |
| 2011/0157870 A1 | 6/2011 | Liu et al. | |
| 2011/0279749 A1* | 11/2011 | Erinjippurath | G09G 3/3426 349/61 |
| 2013/0050130 A1* | 2/2013 | Brown | G06F 3/044 345/174 |
| 2013/0169904 A1* | 7/2013 | Kang | G02B 6/005 349/64 |
| 2013/0300981 A1 | 11/2013 | Sakai | |
| 2014/0139459 A1* | 5/2014 | Wu | G06F 3/0416 345/173 |

FOREIGN PATENT DOCUMENTS

| | | |
|---|---|---|
| JP | 2011-138756 A | 7/2011 |
| JP | 2013-239289 A | 11/2013 |

* cited by examiner

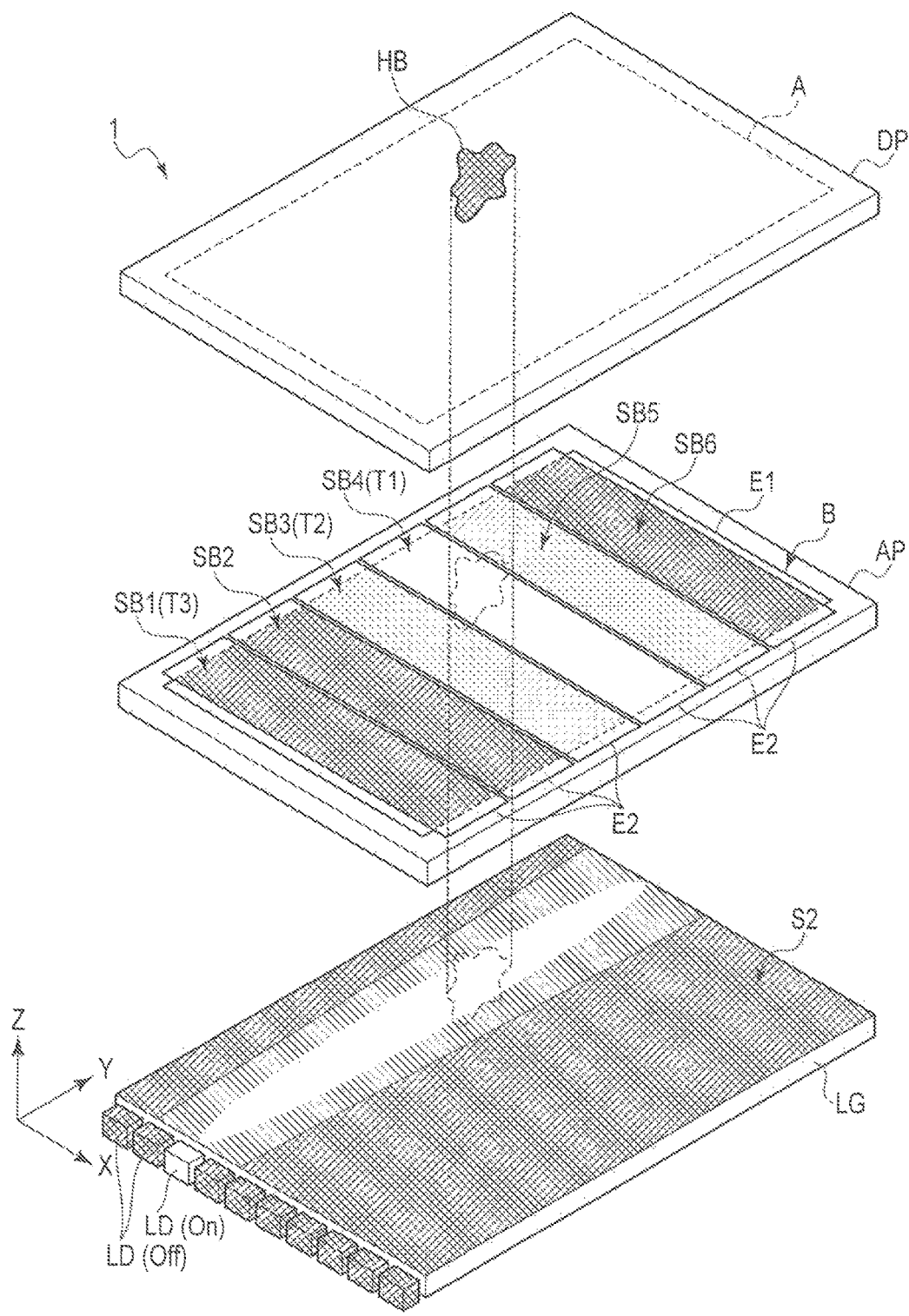
F I G. 3

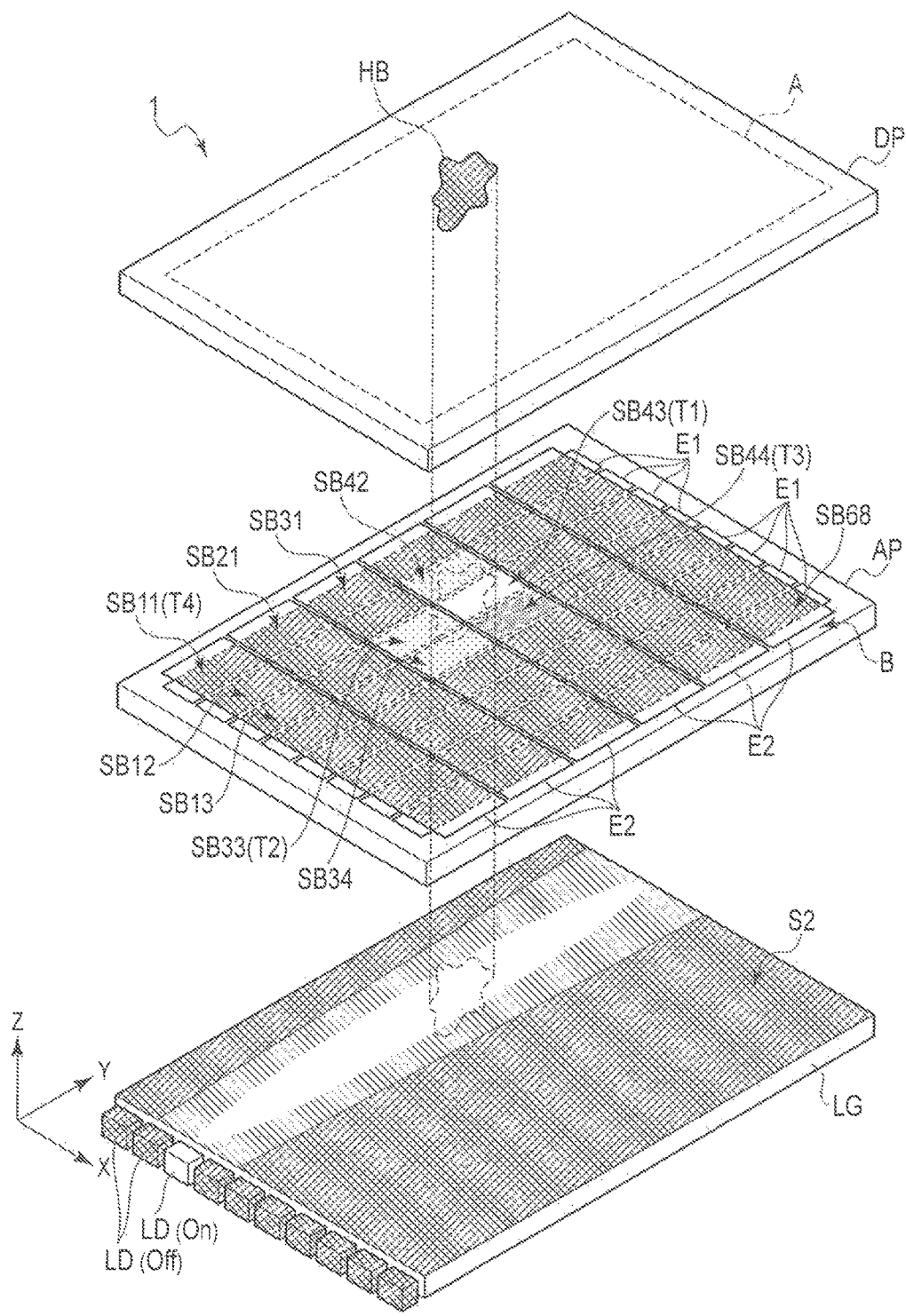
F I G. 4

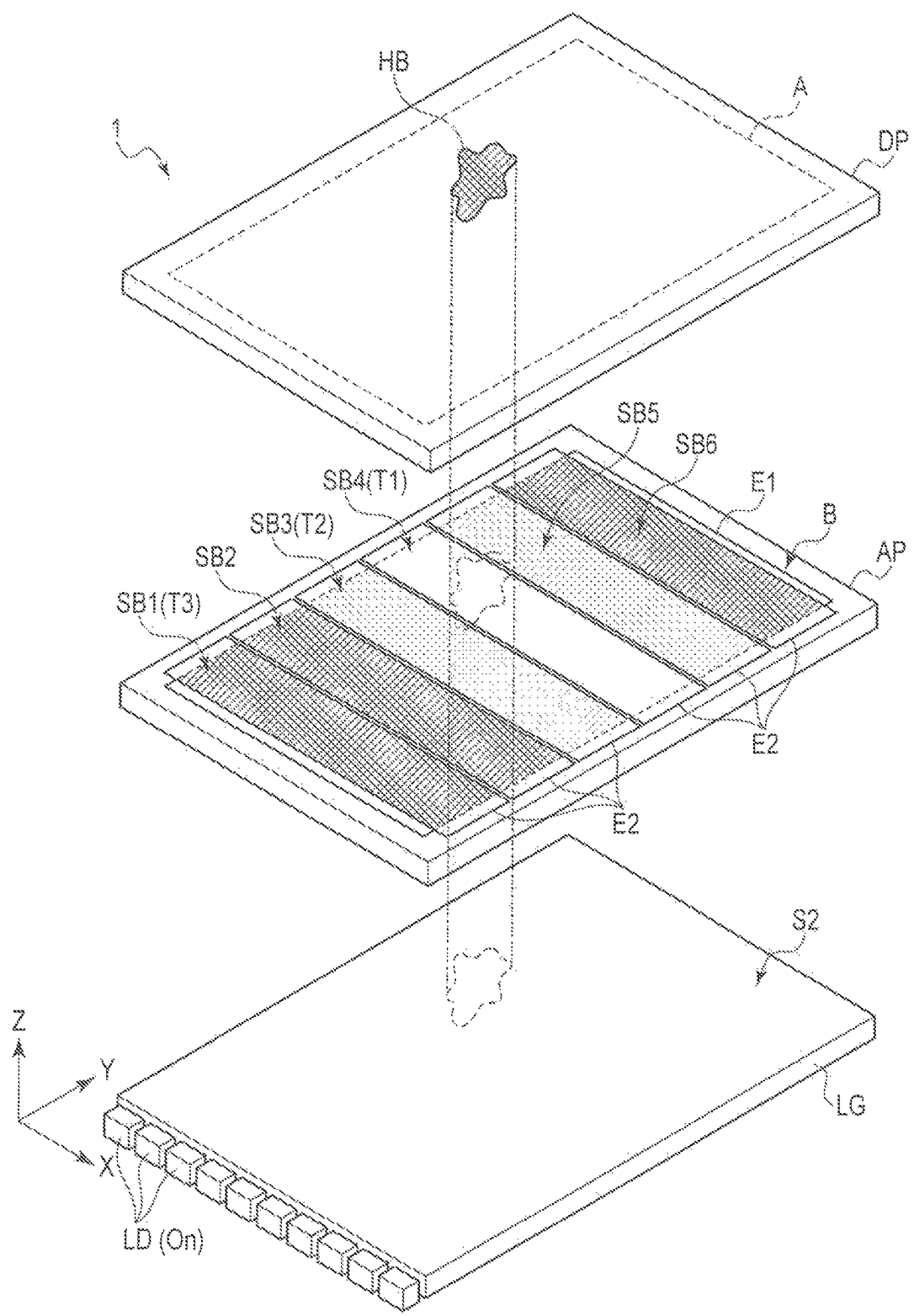
F I G. 6

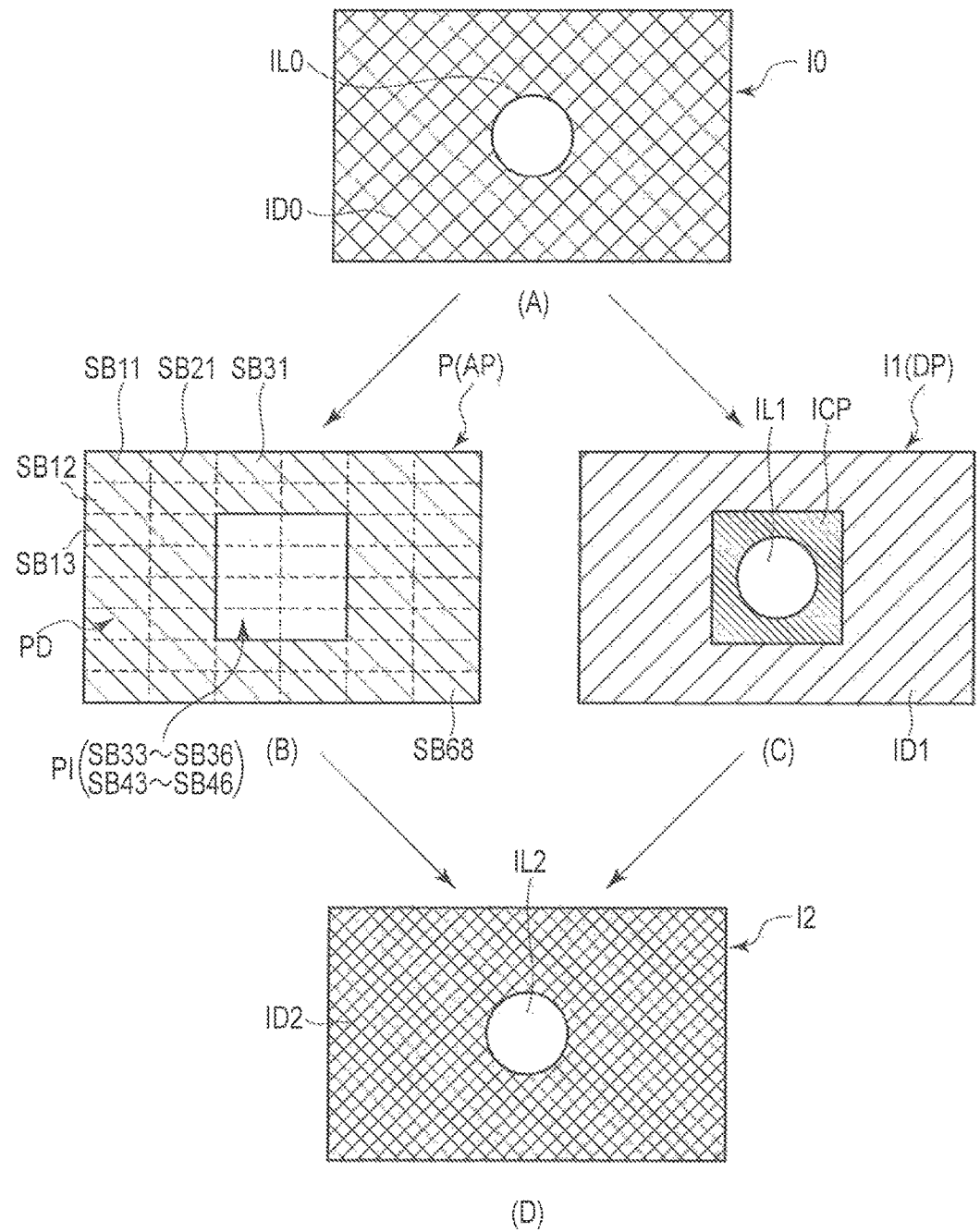
F I G. 14

DISPLAY DEVICE WITH DISPLAY OF COMPLEMENTARY PORTION BETWEEN DARK PORTION AND BRIGHT PORTION

CROSS-REFERENCE TO RELATED APPLICATIONS

This application is based upon and claims the benefit of priority from Japanese Patent Applications No. 2014-198888, filed Sep. 29, 2014; and No. 2015-154693, filed Aug. 5, 2015, the entire contents of all of which are incorporated herein by reference.

FIELD

Embodiments described herein relate generally to a display device.

BACKGROUND

A display device displays an image by letting a display panel selectively transmit light from a backlight. If the luminance of the backlight can be controlled for each predetermined area in this type of display device, the display device has an advantage in terms of the image quality. For example, the contrast of an image can be improved.

The above control of the backlight may be realized by, for example, providing a plurality of light guides facing different areas of the display panel, and a light source which supplies light to each of the light guides, such as a light-emitting diode, on the rear surface side of the display panel. However, in this case, for example, the thickness of the display device is increased since the light-emitting diodes need to be stacked on the display panel. Thus, various problems may occur.

One of embodiments described herein aims to provide a display device capable of improving the image quality by controlling the luminance of a backlight for each portion, or to make the display device thinner.

BRIEF DESCRIPTION OF THE DRAWINGS

FIG. 3 is a perspective view showing a schematic structure of a display device according to a first embodiment.

FIG. 4 is a perspective view showing a schematic structure of a display device according to a second embodiment.

FIG. 6 is a perspective view showing a schematic structure of a display device according to a fourth embodiment.

FIG. 14 shows an example of an image display method according to a ninth embodiment.

DETAILED DESCRIPTION

Figure 1:
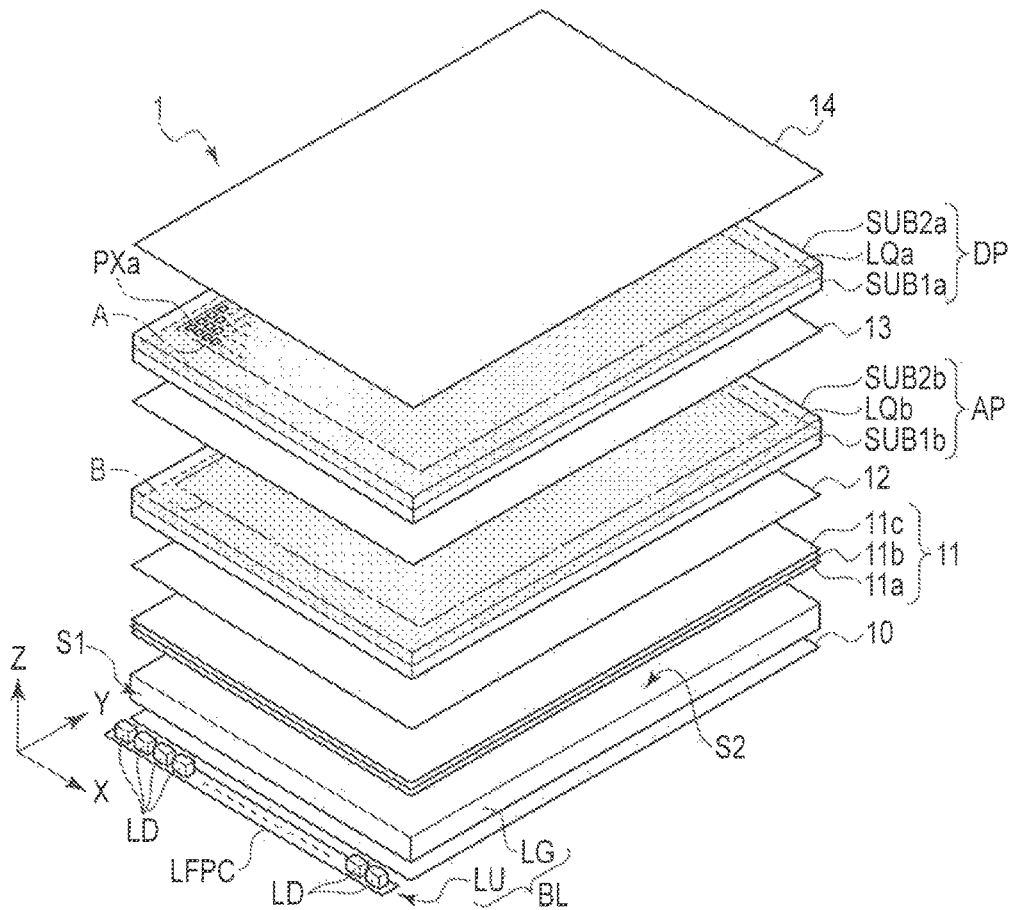
FIG. 1 is an exploded perspective view schematically showing a structural example of a display device common to embodiments.

Embodiments will be described hereinafter with reference to the accompanying drawings.

The embodiments disclosed here are merely examples. Naturally, the present invention includes what can be easily conceived by a person with ordinary skill in the art based on appropriate modifications while maintaining the spirit of the present invention. To further clarify explanation, the width, thickness, shape, etc., of each element may be schematically shown in the drawings compared with the actual form. Note that the drawings are merely examples and do not limit the interpretation of the present invention. In each figure, the reference numbers of elements which are identical to or similar to each other and continuously arranged may be omitted. In the specification and drawings of the present application, structural elements which have functions identical to or similar to those of elements of explained drawings may be denoted by the same reference numbers. Thus, overlapping detailed explanation may be appropriately omitted.

(Overall Structure of Display Device)

First, this specification explains structures common to display devices of embodiments. The display device described below can be used for various devices such as a smartphone, a tablet, a mobile phone, a personal computer, a television receiver, an in-car device and a game device.

FIG. 1 is an exploded perspective view schematically showing a structural example of a display device 1. The display device 1 comprises a backlight BL, a display panel DP and a dimming panel AP.

The backlight BL comprises a light guide LG and a light source unit LU. The backlight BL is an example of an illumination device which supplies light necessary for image display and may be called a surface light source device.

In the example of FIG. 1, each of the display panel DP, the dimming panel AP and the light guide LG is formed in a rectangular shape having short sides along a first direction X and long sides along a second direction Y orthogonal to the first direction X. The light guide LG, the dimming panel AP and the display panel DP are stacked in this order in a third direction Z orthogonal to the first direction X and the second direction Y. The shape of each of the display panel DP, the dimming panel AP and the light guide LG is not limited to a rectangular shape and may be another shape. The position of the display panel DP may be replaced by that of the dimming panel AP to structure the display device 1.

The light guide LG comprises an entrance surface S1 and an exit surface S2. The entrance surface S1 is equivalent to one of a pair of side surfaces of the light guide LG along the first direction X. The exit surface S2 is equivalent to the surface which is one of a pair of main surfaces of the light guide LG and which is located on the dimming panel AP side and the display panel DP side.

The light source unit LU comprises a plurality of light-emitting diodes LD arranged in the first direction X along the entrance surface S1 of the light guide LG, and a flexible circuit board LFPC on which the light-emitting diodes LD are provided. The light source unit LU may comprise other types of light sources such as organic electroluminescence elements instead of the light-emitting diodes LD. The light emitted from the light-emitting diodes LD enters the light guide LG through the entrance surface S1, is propagated through the light guide LG and exits from the exit surface S2. The light emitted from the light-emitting diodes LD diffuses in the first direction X and is propagated through the light guide LG in the second direction Y. By turning on or off the light-emitting diodes LD which are the source of the light propagated mainly in the second direction Y, the backlight BL can be partially driven; in other words, one-dimensional local dimming can be applied to the backlight BL.

The display panel DP is, for example, a transmissive liquid crystal panel and comprises a first substrate SUB1a, a second substrate SUB2a and a liquid crystal layer LQa sealed between the first substrate SUB1a and the second substrate SUB2a. The display panel DP faces the exit surface S2 of the light guide LG and comprises a display area A in which a large number of display pixels PXa are arranged in a matrix state in the first direction X and the second direction Y. Each display pixel PXa includes sub-pixels corresponding to, for example, red, green and blue, respectively. The red sub-pixel includes a color filter colored in red. The green sub-pixel includes a color filter colored in green. The blue sub-pixel includes a color filter colored in blue. Each display pixel PXa may further include sub-pixels corresponding to white, yellow, etc. The display panel DP drives the display pixels PXa in order to selectively transmit the light incident on the display area A from the exit surface S2 of the light guide LG and display color images in the display area A.

Various active matrix types of liquid crystal panels are applicable to the display panel DP; for example, a fringe field switching (FFS) mode, an in-plane switching (IPS) mode, a twisted nematic (TN) mode, a polymer dispersed liquid crystal (PDLC) mode, an optically compensated bend (OCB) mode, an electrically controlled birefringence (ECB) mode and a vertical alignment (VA) mode are applicable.

The dimming panel AP is, for example, a liquid crystal panel and comprises a first substrate SUB1b, a second substrate SUB2b and a liquid crystal layer LQb sealed between the first substrate SUB1b and the second substrate SUB2b. The dimming panel AP comprises a dimming area B facing the exit surface S2 of the light guide LG and the display area A of the display panel DP. The dimming panel AP is capable of adjusting the transmittance of the light incident on the dimming area B from the exit surface S2 side to the display panel DP side for each section in the dimming area B. For example, the dimming panel AP does not comprise a color filter. The hue of the light from the exit surface S2 is nearly unchanged between before and after transmission through the dimming panel AP. The specific structures and control examples of the dimming panel AP are explained later in each embodiment.

The display panel DP or the dimming panel AP is not necessarily a liquid crystal panel. For example, the display panel DP and the dimming panel AP may be display panels to which micro-electromechanical systems (MEMS) are applied, or may be display panels to which electrochromism is applied.

The display device 1 further comprises a reflective sheet 10, an optical sheet group 11, a first polarizer 12, a second polarizer 13 and a third polarizer 14. In the example of FIG. 1, each of the reflective sheet 10, the optical sheet group 11, the first polarizer 12, the second polarizer 13 and the third polarizer 14 is formed in a rectangular shape having short sides along the first direction X and long sides along the second direction Y. The shape of each of the reflective sheet 10, the optical sheet group 11, the first polarizer 12, the second polarizer 13 and the third polarizer 14 is not limited to a rectangular shape and may be another shape.

The reflective sheet 10 is attached to the rear surface of the light guide LG; in other words, of a pair of main surfaces of the light guide LG, the surface opposite to the exit surface S2. The reflective sheet 10 returns light which leaks from the rear surface to the light guide LG. A reflective sheet may be further attached to a side surface of the light guide LG excluding the entrance surface S1.

The optical sheet group 11 includes, for example, a diffusion sheet 11a, a first prism sheet 11b and a second prism sheet 11c. The diffusion sheet 11a diffuses light which exits from the exit surface S2 of the light guide LG and is transmitted through the dimming panel AP. In the first prism sheet 11b and the second prism sheet 11c, a large number of prism lenses are formed.

The first polarizer 12 is provided between the light guide LG and the dimming panel AP and is attached to the outer surface of the first substrate SUB1b of the dimming panel AP via, for example, an adhesion layer. The second polarizer 13 is provided between the dimming panel AP and the display panel DP and is attached to the outer surface of the first substrate SUB1a of the display panel DP via, for example, an adhesion layer. The third polarizer 14 is attached to the outer surface of the second substrate SUB2a of the display panel DP via, for example, an adhesion layer.

Thus, the first polarizer 12 and the second polarizer 13 are provided so as to interpose the dimming panel AP between them. The third polarizer 14 and the second polarizer 13 are provided so as to interpose the display panel DP between them.

The first polarizer 12 and the third polarizer 14 comprise a first polarizing axis. The second polarizer 13 comprises a second polarizing axis orthogonal to the first polarizing axis. Thus, the first polarizer 12 and the second polarizer 13 have a positional relationship of crossed-Nicol, and further, the second polarizer 13 and the third polarizer 14 have a positional relationship of crossed-Nicol.

In the display device 1 having the above structures, the light from the exit surface S2 of the light guide LG is transmitted through the first polarizer 12 and enters the dimming panel AP. The light incident on the dimming panel AP is linearly-polarized light orthogonal to the first polarizing axis of the first polarizer 12. The polarization state of this light is nearly unchanged when the light passes through a region in the initial alignment state on the liquid crystal layer LQb. The light is absorbed by the second polarizer 13 comprising the second polarizing axis orthogonal to the first polarizing axis.

On the other hand, the polarization state of light which enters the dimming panel AP is changed when the light passes through a region whose alignment state is changed from the initial alignment state by application of voltage on the liquid crystal layer LQb. At least a part of the light is changed in the polarization state so as to be orthogonal to the second polarizing axis of the second polarizer 13. Thus, the second polarizer 13 transmits at least a part of the light.

The light transmitted through the second polarizer 13 enters the display panel DP. The light incident on the display panel DP is linearly-polarized light orthogonal to the second polarizing axis of the second polarizer 13. The polarization state of this light is nearly unchanged when the light passes through a region corresponding to a display pixel PXa in an off-state on the liquid crystal layer LQa; in other words, a region in the initial alignment state. The light is absorbed by the third polarizer 14 comprising the first polarizing axis orthogonal to the second polarizing axis.

On the other hand, the polarization state of the light incident on the display panel DP is changed when the light passes through a region corresponding to a display pixel PXa in an on-state on the liquid crystal layer LQa; in other words, a region whose alignment state is changed from the initial alignment state. At least a part of the light is changed in the polarization state so as to be orthogonal to the first polarizing axis. Thus, the third polarizer 14 transmits at least a part of the light in order to form an image.

Figure 2:
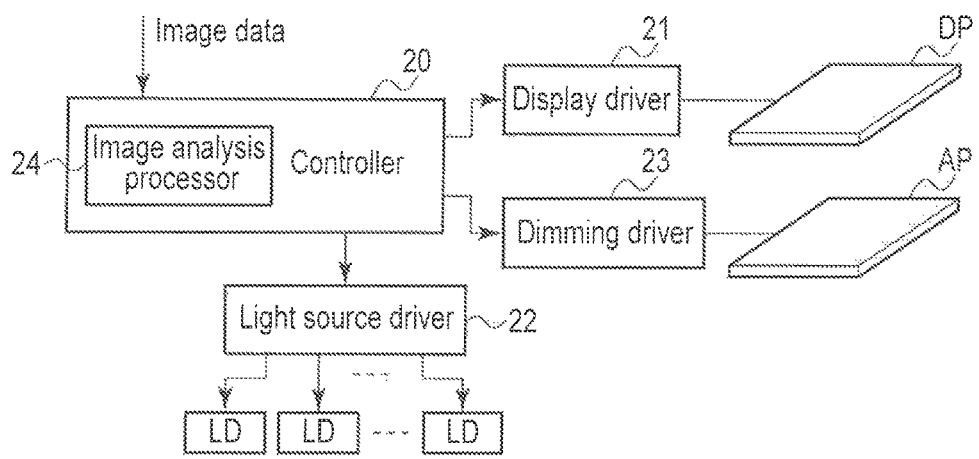
FIG. 2 is a block diagram schematically showing some of control elements provided in the display device.

FIG. 2 is a block diagram schematically showing some of control elements provided in the display device 1. The display device 1 comprises, as main control elements, a controller 20, a display driver 21, a light source driver 22 and a dimming driver 23.

The controller 20 comprises, for example, flexible wiring substrates extending from the display panel DP and the dimming panel AP, and electronic components mounted on the wiring substrates such as an IC. The controller 20 may further comprise other electronic components connected to each flexible wiring substrate.

For example, the display driver 21 is formed as a built-in circuit in the display panel DP. For example, the dimming driver 23 is formed as a built-in circuit in the dimming panel AP. The display driver 21 and the dimming driver 23 may be formed outside the display panel DP and the dimming panel AP.

For example, the light source driver 22 comprises the flexible circuit board LFPC and electronic components mounted on the circuit board such as an IC.

The controller 20 receives image data for one frame to be displayed in the display area A in series from, for example, the main board of the electronic device in which the display device 1 is mounted. The image data includes, for example, the information of color and brightness to be displayed by each display pixel PXa in the display area A. The controller 20 supplies a signal for driving each display pixel PXa of the display panel DP to the display driver 21 based on the received image data. The display driver 21 selectively turns each display pixel PXa on and off based on the signal supplied from the controller 20.

The controller 20 comprises an image analysis processor 24. The image analysis processor 24 analyzes the image data received by the controller 20, determines the luminance of the light-emitting diodes LD provided in the light source unit LU and determines the transmittance distribution of the dimming area B. The controller 20 supplies a signal which indicates the luminance of the light-emitting diodes LD determined by the image analysis processor 24 to the light source driver 22. The controller 20 supplies a signal which indicates the transmittance distribution of the dimming area B determined by the image analysis processor 24 to the dimming driver 23.

The light source driver 22 causes each light-emitting diode LD to light with the luminance indicated by the signal supplied from the controller 20 by, for example, adjusting the voltage supplied to the light-emitting diode LD. When there is a light-emitting diode LD whose luminance is determined as zero by the image analysis processor 24, the light source driver 22 does not turn the light-emitting diode LD on. The dimming driver 23 drives the dimming panel AP such that the light from the exit surface S2 is transmitted through the first polarizer 12, the dimming panel AP and the second polarizer 13 with the transmittance distribution indicated by the signal supplied from the controller 20.

The light which exits from the exit surface S2 of the light guide LG when the light-emitting diodes LD are turned on enters the display area A with the luminance distribution in accordance with the transmittance distribution of the dimming area B, then the light forms an image in accordance with the on/off state of each display pixel PXa in the display area A. The dimming panel AP functions as a dimming device configured to dynamically adjust the luminance of the light incident on the display panel DP from the exit surface S2 in accordance with the image displayed in the display area A. This type of dimming device may be called a light control device.

To control the luminance of the light incident on the display panel for each section, the following methods can be considered. For example, a large number of light sources such as light-emitting diodes are provided immediately under the display panel. The luminance of each light source may be adjusted. As another method, a plurality of light guides and a light source which supplies light to each light guide are provided immediately under the display panel. The luminance may be adjusted for each light guide. However, if these methods are employed, the thickness of the display device is increased in association with the thickness of the light sources.

In the structure of the display device 1 shown in FIG. 1, there is no need to provide the light-emitting diodes LD which are light sources immediately under the display panel DP. Therefore, the increase in the thickness of the display device 1 can be prevented.

For example, the thickness of the light guide LG is approximately 500 μm. The thickness of each of the dimming panel AP and the display panel DP is approximately 300 μm. The thickness of each of the first polarizer 12, the second polarizer 13 and the third polarizer 14 is approximately 80 to 160 μm. Therefore, in the display device 1, the thickness is increased by only 380 to 460 μm equivalent to the thickness of the dimming panel AP and one polarizer in comparison with a common display device. On the other hand, when a light source such as a light-emitting diode is provided immediately under the display panel, the thickness is expected to increase by at least 1 mm.

In the example of FIG. 1, the display device 1 comprises three polarizers 12, 13 and 14. However, the display device 1 may comprise two polarizers provided on both main surfaces of the display panel DP, and two polarizers provided on both main surfaces of the dimming panel AP. In this case, the thickness of the display device 1 is increased by one additional polarizer. Therefore, in terms of the thickness, the structure shown in FIG. 1 is advantageous.

Now, this specification explains first to sixth embodiments applicable to the display device 1.

First Embodiment

FIG. 3 is a perspective view showing a schematic structure of a display device 1 according to a first embodiment. FIG. 3 shows, of the structural elements of the display device 1, a display panel DP, a dimming panel AP, a light guide LG and light-emitting diodes LD. In the example of FIG. 3, the display device 1 comprises ten light-emitting diodes LD.

The dimming panel AP comprises a first electrode E1 and n second electrodes E2, where n is an integer greater than or equal to two. Each second electrode E2 extends in a band shape in a first direction X in a dimming area B. The second electrodes E2 are arranged in a second direction Y. The first electrode E1 has a size so as to cover the whole part of the dimming area B and faces the second electrodes E2 with a liquid crystal layer LQb being interposed. For example, the first electrode E1 is provided in a first substrate SUB1b of the dimming panel AP. The second electrodes E2 are provided in a second substrate SUB2b of the dimming panel AP. The first electrode E1 and the second electrodes E2 are formed of, for example, transparent conductive materials such as indium tin oxide (ITO) or indium zinc oxide (IZO).

The dimming area B comprises a plurality of sub-areas SBi (i=1 to n) arranged in the second direction Y. Each sub-area SB is equivalent to an area in which the first electrode E1 faces a second electrode E2. In the example of FIG. 3, n is equal to six.

The first electrode E1 is set to the common potential. The dimming driver 23 shown in FIG. 2 selectively supplies drive voltage to each second electrode E2. The electrical field produced between a second electrode E2 to which drive voltage is supplied and the first electrode E1 changes the alignment state of liquid crystal molecules of the liquid crystal layer LQb between these electrodes from the initial alignment state. In a sub-area SB corresponding to the above second electrode E2, the light from an exit surface S2 is transmitted through the dimming panel AP and a second polarizer 13 and enters the display panel DP.

The structure of this type of dimming panel AP is similar to that of a passive liquid crystal panel, and thus, is simple. Therefore, it is possible to produce the dimming panel AP at low cost. As the passive liquid crystal panel, for example, a crystal panel having a TN mode or a PDLC mode may be used.

In the present embodiment, it is possible to adjust the transmittance distribution of the dimming area B for each of the sub-areas SB arranged in the second direction Y by controlling the drive voltage of each of the second electrodes E2. In addition, it is possible to adjust the luminance of the exit surface S2 for each of the regions arranged in the first direction X by controlling the luminance of the light-emitting diodes LD arranged in the first direction X. By the dimming panel AP and a backlight BL, the luminance distribution of the light incident on the display panel DP can be adjusted in a two-dimensional manner. Thus, two-dimensional local dimming can be realized.

Now, this specification explains a use example of the above two-dimensional local dimming.

For example, as shown in FIG. 3, when a high-brightness portion HB which is brighter than the surrounding area is included in the image displayed in the display area A, each light-emitting diode LD and the dimming panel AP are controlled such that the light from the backlight BL enters the display panel DP with the luminance distribution in which a position corresponding to the high-brightness portion HB has high luminance.

In the example of FIG. 3, the third light-emitting diode LD from the left corresponding to the position of the high-brightness portion HB in the first direction X is turned on, and the other light-emitting diodes are turned off. In this manner, on the exit surface S2 of the light guide LG, the luminance of the region corresponding to the light-emitting diode LD in an on-state is high and the luminance of the other regions is low. The light from the high-luminance region of the exit surface S2 enters the dimming area B. The dimming panel AP is controlled such that: the transmittance of sub-areas SB3, SB4 and SB5 corresponding to the position of the high-brightness portion HB in the second direction Y is high; and the transmittance of the other sub-areas SB1, SB2 and SB6 is low. The dimming panel AP changes the light transmittance for each portion of the region which the light from the high-luminance region of the exit surface S2 enters in the dimming area B. In this manner, in the light incident on the display panel DP, the luminance is high near the high-brightness portion HB and is low in the other portions. It is possible to enhance the contrast between the high-brightness portion HB and its surrounding area in comparison with the case where light enters the display panel DP with a uniform luminance distribution.

Not all light-emitting diodes LD are always turned on. Instead, it is possible to turn on light-emitting diodes LD necessary for display and turn off the others. Thus, the power consumption of the display device 1 can be reduced.

In the example of FIG. 3, the dimming panel AP is controlled such that: sub-area SB4 in which the area overlapped with the high-brightness portion HB is the largest has a first transmittance T1; sub-areas SB3 and SB5 in which the area overlapped with the high-brightness portion HB is smaller than sub-area SB4 have a second transmittance T2 less than the first transmittance T1 (T1>T2); and sub-areas SB1, SB2 and SB6 which do not overlap the high-brightness portion HB have a third transmittance T3 less than the second transmittance T2 (T2>T3). In FIG. 3, these transmittances are shown by different types of hatching. By controlling the transmittance of the sub-areas SB in multiple stages, the contrast of the display image can be adjusted more finely.

The number of stages of adjustable transmittance is not limited to three and may be more than three. The parameter to determine the transmittance is not limited to the area overlapped with the high-brightness portion HB. As the parameter, various parameters can be employed. For example, the transmittance may be determined in accordance with the sum or average of brightness of the display pixels PXa of an image displayed in a range corresponding to each sub-area SB in the display area A.

The luminance of the light-emitting diodes LD may be also controlled in multiple stages. In the example of FIG. 3, one light-emitting diode LD is turned on, and the other light-emitting diodes LD are turned off. However, a plurality of light-emitting diodes LD may be turned on at the same time.

Second Embodiment

FIG. 4 is a perspective view showing a schematic structure of a display device 1 according to a second embodiment. FIG. 4 shows, of the structural elements of the display device 1, a display panel DP, a dimming panel AP, a light guide LG and light-emitting diodes LD.

The display device 1 shown in FIG. 4 is different from the display device 1 shown in FIG. 3 in respect that the dimming panel AP comprises m first electrodes E1, where m is an integer greater than or equal to two. Each first electrode E1 extends in a band shape in a second direction Y. The first electrodes E1 are arranged in a first direction X.

The first electrodes E1 face second electrodes E2 with a liquid crystal layer LQb being interposed. In this structure, a plurality of sub-areas SBij (i=1 to n, j=1 to m) are arranged in an n×m matrix and are formed in a dimming area B. In the example of FIG. 4, n is equal to six and m is equal to eight.

For example, drive voltage having a different polarity is applied to one of the first electrodes E1 and one of the second electrodes E2. In this manner, an electrical field having a predetermined strength is produced in a sub-area SB corresponding to the cross area of these electrodes. By this electrical field, a portion corresponding to the sub-area SB is driven on the liquid crystal layer LQb. Thus, the transmittance of a specific sub-area SB can be enhanced. It is also possible to adjust the transmittance of a plurality of sub-areas SB substantially at the same time by driving each first electrode E1 and each second electrode E2 at high speed by time division.

As is the case with the first embodiment, the structure of the dimming panel AP of the present embodiment is similar to that of a passive liquid crystal panel, and thus, is simple. Therefore, it is possible to produce the dimming panel AP at low cost.

In the present embodiment, the transmittance distribution of the dimming area B can be adjusted for each of the sub-areas SB arranged in the first direction X and the second direction Y by controlling the drive voltage of each first electrode E1 and each second electrode E2. By the dimming panel AP, two-dimensional local dimming can be realized. The two-dimensional local dimming enables the luminance distribution of the light incident on the display panel DP to be adjusted in a two-dimensional manner.

Further, it is possible to reduce the power consumption of the display device 1 by turning off a light-emitting diode LD corresponding to a region which does not require illumination in a display area A or turning on the light-emitting diode LD with a low luminance in comparison with the case where all of the light-emitting diodes LD are always turned on with a predetermined luminance.

As is the case with the first embodiment, each light-emitting diode LD and the dimming panel AP are controlled such that the light from the backlight BL enters the display panel DP with the luminance distribution in which the luminance of the position corresponding to a high-brightness portion HB is high. By this control, it is possible to enhance the contrast between the high-brightness portion HB and its surrounding area.

In the example of FIG. 4, the dimming panel AP is controlled such that: sub-area SB43 in which the area overlapped with the high-brightness portion HB is the largest has a first transmittance T1; sub-areas SB33, SB34 and SB42 in which the area overlapped with the high-brightness portion HB is smaller than sub-area SB43 have a second transmittance T2 less than the first transmittance T1 (T1>T2); sub-area SB44 in which the area overlapped with the high-brightness portion HB is smaller than sub-areas SB33, SB34 and SB42 has a third transmittance T3 less than the second transmittance T2 (T2>T3); and the other sub-areas SB which do not overlap the high-brightness portion HB have a fourth transmittance T4 less than the third transmittance T3 (T3>T4). In FIG. 4, these transmittances are shown by different types of hatching.

The number of stages of adjustable transmittance is not limited to four and may be more than four. The parameter to determine the transmittance is not limited to the area overlapped with the high-brightness portion HB. Various parameters can be employed. For example, the transmittance may be determined in accordance with the sum or average of brightness of the display pixels PXa of an image displayed in a range corresponding to each sub-area SB in the display area A.

Third Embodiment

Figure 5:
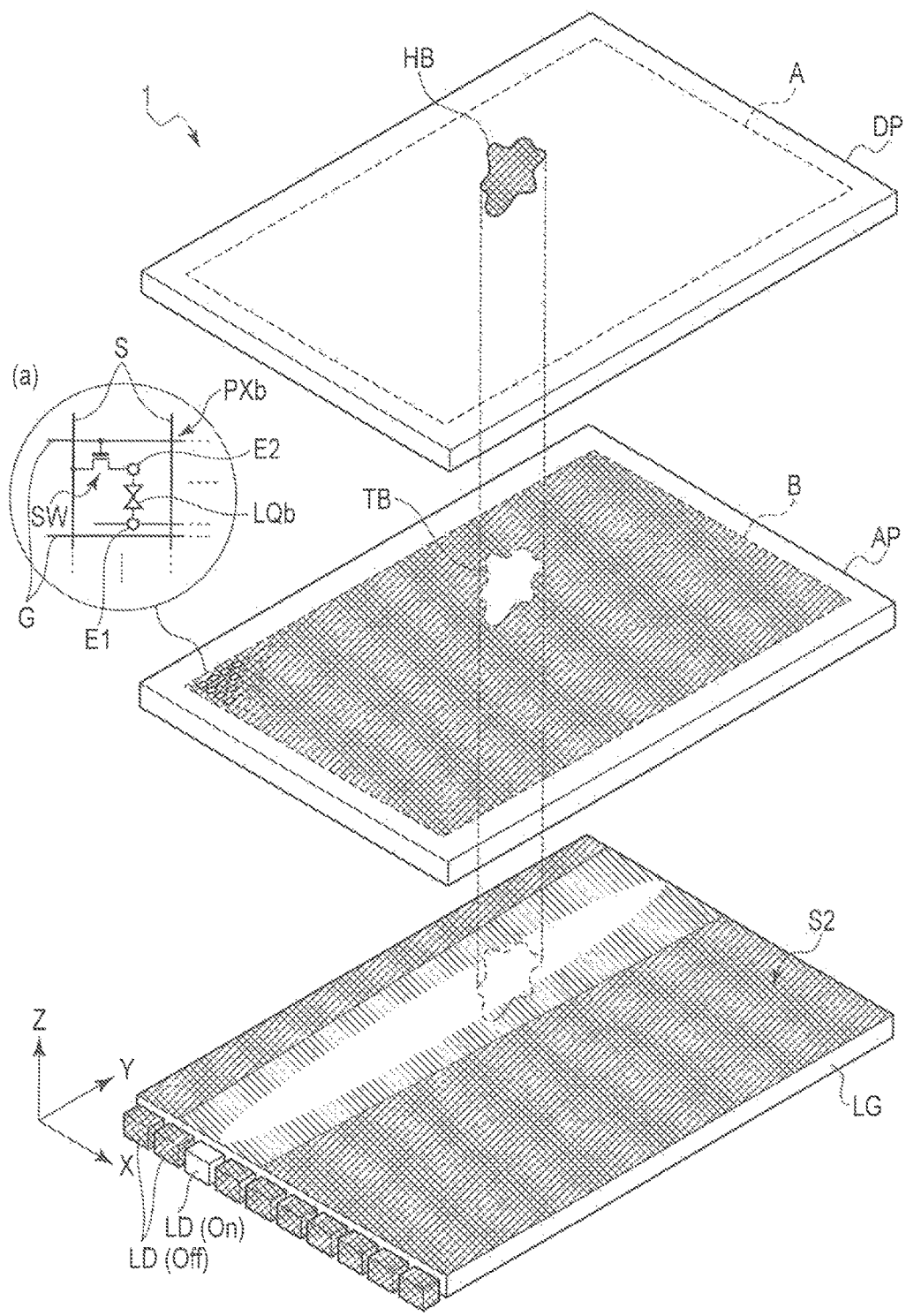
FIG. 5 is a perspective view showing a schematic structure of a display device according to a third embodiment.

FIG. 5 is a perspective view showing a schematic structure of a display device 1 according to a third embodiment. FIG. 5 shows, of the structural elements of the display device 1, a display panel DP, a dimming panel AP, a light guide LG and light-emitting diodes LD.

The display device 1 shown in FIG. 5 is different from the display device 1 shown in FIG. 3 in respect that the dimming panel AP comprises a large number of dimming pixels PXb arranged in a matrix state in a first direction X and a second direction Y in a dimming area B.

As shown in, for example, FIG. 5(a), each dimming pixel PXb corresponds to a region sectioned by a plurality of gate lines G extending in parallel with each other and a plurality of source lines S intersecting with the gate lines G and extending in parallel with each other. Each dimming pixel PXb comprises a first electrode E1 which is set to the common potential, a switching element SW (for example, a thin-film transistor) which is electrically connected to the gate lines G and the source lines S, and a second electrode E2 which is electrically connected to the switching element SW. The first electrode E1 is a common electrode provided over a plurality of dimming pixels PXb, and the second electrode E2 is a pixel electrode provided for each dimming pixel PXb. A dimming driver 23 is capable of turning each dimming pixel PXb on or off by selectively driving each gate line G and each source line S. When a dimming pixel PXb is turned on, an electrical field is produced between the first electrode E1 and the second electrode E2. The electrical field changes the alignment state of a region corresponding to the dimming pixel PXb on a liquid crystal layer LQb from the initial alignment state.

Various active matrix types of liquid crystal panels are applicable to the dimming panel AP comprising the dimming pixels PXb; for example, an FFS mode, an IPS mode, a TN mode, a PDLC mode, an OCB mode, an ECB mode and a VA mode are applicable. In the present embodiment, the transmittance distribution of the dimming area B can be adjusted for each dimming pixel PXb. By the dimming panel AP, two-dimensional local dimming can be realized. The two-dimensional local dimming enables the luminance distribution of the light incident on the display panel DP to be adjusted in a two-dimensional manner. Further, it is possible to reduce the power consumption of the display device 1 by turning off a light-emitting diode LD corresponding to a region which does not require illumination in a display area A or turning on the light-emitting diode LD with a low luminance in comparison with the case where all of the light-emitting diodes LD are always turned on with a predetermined luminance.

As is the case with the first embodiment, each light-emitting diode LD and the dimming panel AP are controlled such that the light from a backlight BL enters the display panel DP with the luminance distribution in which the luminance of the position corresponding to a high-brightness portion HB is high. By this control, it is possible to enhance the contrast between the high-brightness portion HB and its surrounding area.

In the example of FIG. 5, a high-transmittance area TB having substantially the same shape as the high-brightness portion HB is formed in the dimming area B. Further, a light-emitting diode LD corresponding to the position of the high-transmittance area TB in the first direction X is turned on. In this manner, the light from the backlight BL enters a position corresponding to the high-brightness portion HB in the display area A.

The shape of the high-transmittance area TB is not limited to the same shape as the high-brightness portion HB. The high-transmittance area TB may be larger or smaller than the high-brightness portion HB. In the example of FIG. 5, one high-transmittance area TB is formed. However, a plurality of high-transmittance areas TB may be formed at the same time.

In the present embodiment, the light incident on the display area A can be finely adjusted for each dimming pixel PXb. Thus, it is possible to further enhance the contrast of an image displayed in the display area A.

Fourth Embodiment

A fourth embodiment is a modification example of the first embodiment. FIG. 6 is a perspective view showing a schematic structure of a display device 1 according to the fourth embodiment. FIG. 6 shows, of the structural elements of the display device 1, a display panel DP, a dimming panel AP, a light guide LG and light-emitting diodes LD.

The present embodiment is different from the first embodiment in respect that the partial drive of a backlight BL is not performed. That is, the light-emitting diodes LD are turned on with the same luminance, and the luminance distribution of an exit surface S2 of the light guide LG is substantially uniform.

Even in this structure, the luminance distribution of the light incident on a display area A can be adjusted for each sub-area SB by the dimming panel AP. In the present embodiment, the control of the backlight BL can be simplified.

Fifth Embodiment

Figure 7:
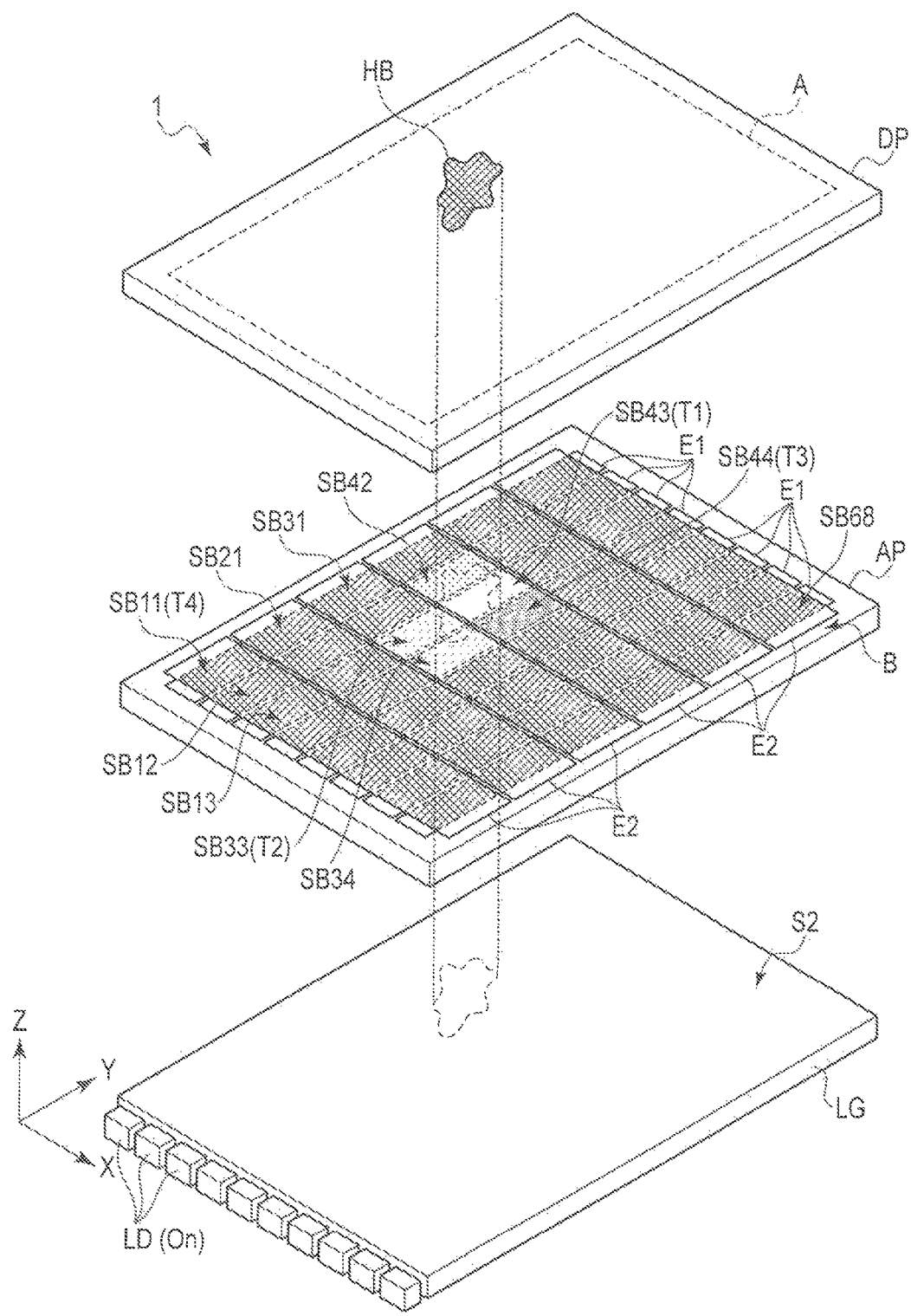
FIG. 7 is a perspective view showing a schematic structure of a display device according to a fifth embodiment.

A fifth embodiment is a modification example of the second embodiment. FIG. 7 is a perspective view showing a schematic structure of a display device 1 according to the fifth embodiment. FIG. 7 shows, of the structural elements of the display device 1, a display panel DP, a dimming panel AP, a light guide LG and light-emitting diodes LD.

The present embodiment is different from the second embodiment in respect that the partial drive of a backlight BL is not performed. That is, the light-emitting diodes LD are turned on with the same luminance, and the luminance distribution of an exit surface S2 of the light guide LG is substantially uniform.

Even in this structure, the luminance distribution of the light incident on a display area A can be adjusted for each sub-area SB in a two-dimensional manner by the dimming panel AP. In the present embodiment, the control of the backlight BL can be simplified.

Sixth Embodiment

Figure 8:
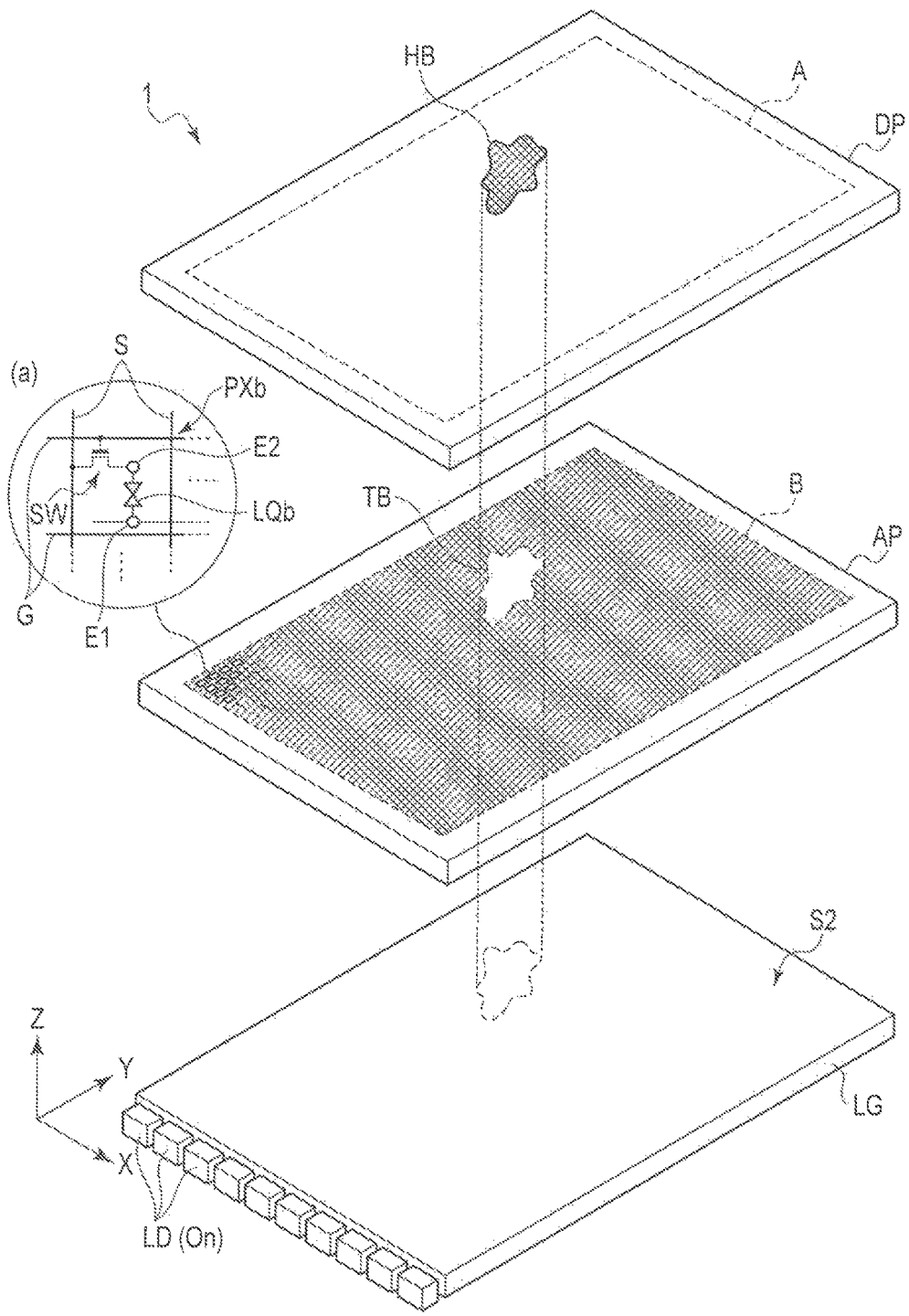
FIG. 8 is a perspective view showing a schematic structure of a display device according to a sixth embodiment.

A sixth embodiment is a modification example of the third embodiment. FIG. 8 is a perspective view showing a schematic structure of a display device 1 according to the sixth embodiment. FIG. 8 shows, of the structural elements of the display device 1, a display panel DP, a dimming panel AP, a light guide LG and light-emitting diodes LD.

The present embodiment is different from the third embodiment in respect that the partial drive of a backlight BL is not performed. That is, the light-emitting diodes LD are turned on with the same luminance and the luminance distribution of an exit surface S2 of the light guide LG is substantially uniform.

Even in this structure, the luminance distribution of the light incident on a display area A can be adjusted for each dimming pixel PXb in a two-dimensional manner by the dimming panel AP. In the present embodiment, the control of the backlight BL can be simplified.

Seventh Embodiment

In the examples shown in the first to sixth embodiments, the dimming panel AP is used to adjust the luminance of the light incident on the display area A. However, the dimming panel AP may be used as a sensor device for sensing an object which contacts or is close to the display area A.

Figure 9:
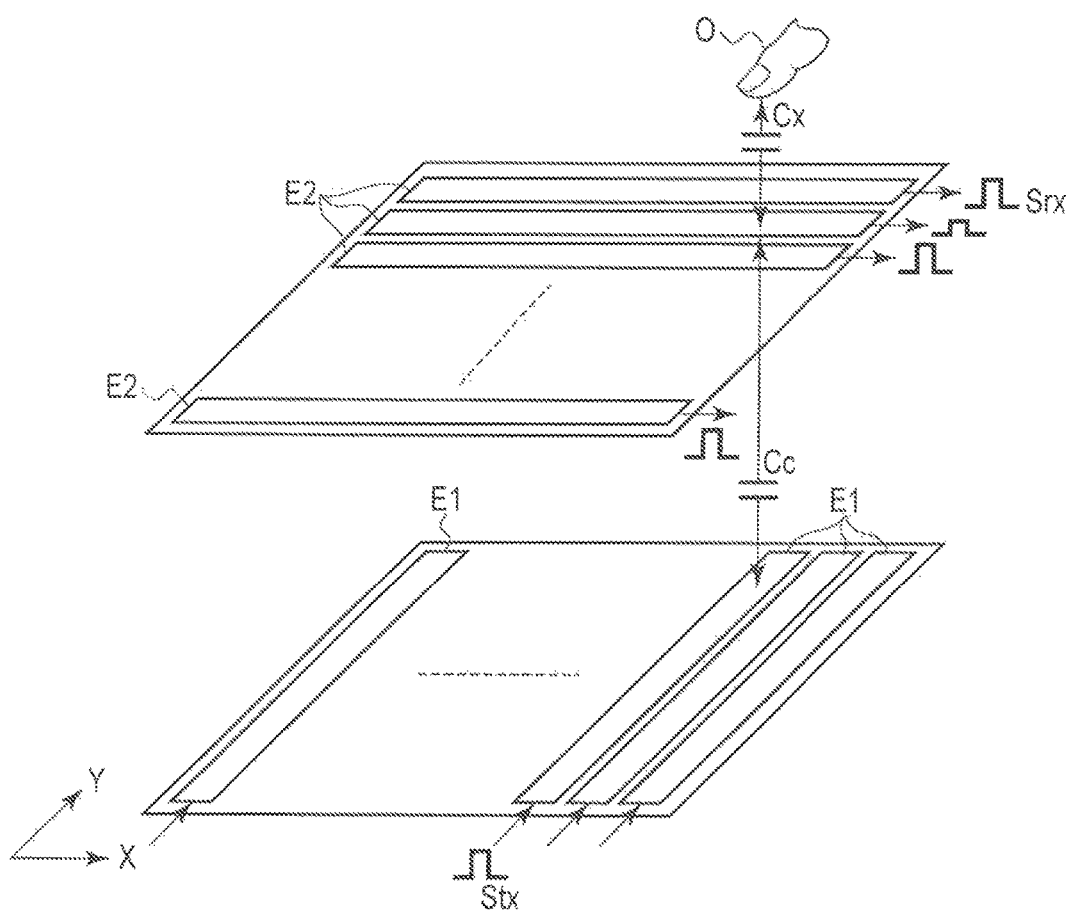
FIG. 9 is shown for explaining an example of a sensing method using a dimming panel according to a seventh embodiment.

FIG. 9 is shown for explaining an example of a sensing method using the dimming panel AP. The method explained with reference to the figure is applicable to, for example, the dimming panel AP of the second and fifth embodiments.

Capacitance Cc is present between a first electrode E1 and a second electrode E2. When a drive signal Stx is supplied to the first electrode E1, current flows through the second electrode E2 via capacitance Cc, and a detection signal Srx is obtained from the second electrode E2. The drive signal Stx is, for example, a rectangular pulse. The detection signal Srx is a rectangular pulse of voltage corresponding to the drive signal Stx.

If a conductive object O such as a finger of the user approaches a display device 1, capacitance Cx is produced between the object O and the second electrode E2 which is close to the object O. When a drive signal Stx is supplied to each first electrode E1, the waveform of the detection signal Srx obtained from the second electrode E2 which is close to the object O is changed by the effect of capacitance Cx. Thus, it is possible to detect the object O which contacts or is close to the display device 1 based on the detection signal Srx obtained from each second electrode E2. Further, it is possible to detect the position of the object O in a first direction X and a second direction Y based on the detection signal Srx which is obtained from each second electrode E2 in each time phase when a drive signal Stx is supplied to each first electrode E1 in series by time division. The method explained above is called a mutual capacitance method or a mutual detection method.

The sensing related to the mutual capacitance method may be realized using the dimming panel AP of the first and fourth embodiments. It is possible to detect the object O and the position of the object O in the second direction Y based on the detection signal Srx which is obtained from each second electrode E2 when a drive signal Stx is supplied to each first electrode E1.

Figure 10:
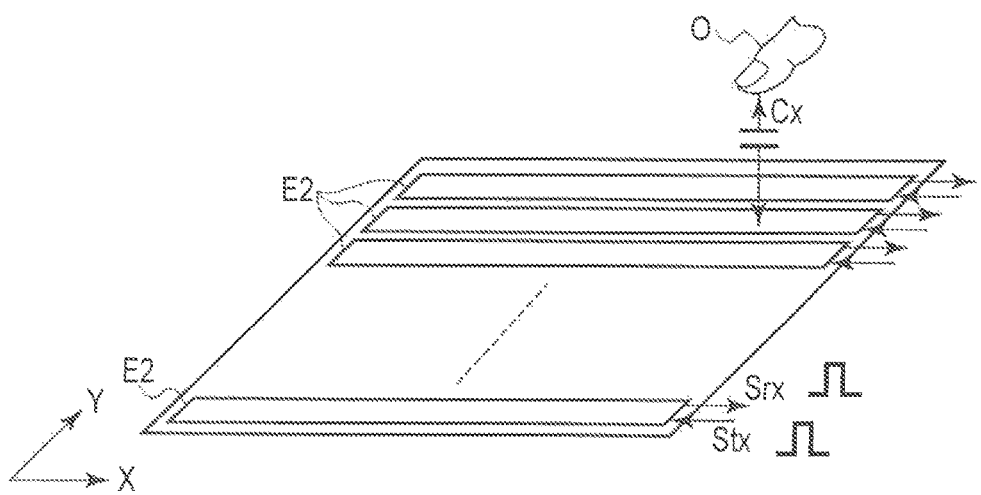
FIG. 10 is shown for explaining another sensing method using the dimming panel according to the seventh embodiment.

FIG. 10 is shown for explaining another sensing method using the dimming panel AP. The method explained with reference to this figure is applicable to, for example, the dimming panel AP of the first, second, fourth and fifth embodiments.

In the sensing method shown in FIG. 10, a drive signal Stx is supplied to each second electrode E2. By the drive signal Stx, the capacitance (self-capacitance) of each second electrode E2 is charged. The charge amount stored in the self-capacitance is changed depending on capacitance Cx produced between the object O and each second electrode E2. When the charge stored in the self-capacitance of each second electrode E2 is read as a detection signal Srx, the object O can be detected based on the values of these detection signals Srx. Moreover, the position of the object O in the second direction Y can be detected. The method explained above is called a self-capacitance method or a self-detection method.

For example, when the second electrodes E2 each having an island shape are arranged in a dimming area B in a two-dimensional manner, it is possible to detect the position of the object O in the first direction X and the second direction Y in the self-capacitance method as well. In the dimming panel AP of the third and sixth embodiments, it is also possible to realize a self-capacitance type of sensor device, using the first electrodes E1 provided over a plurality of dimming pixels PXb.

Figure 11:
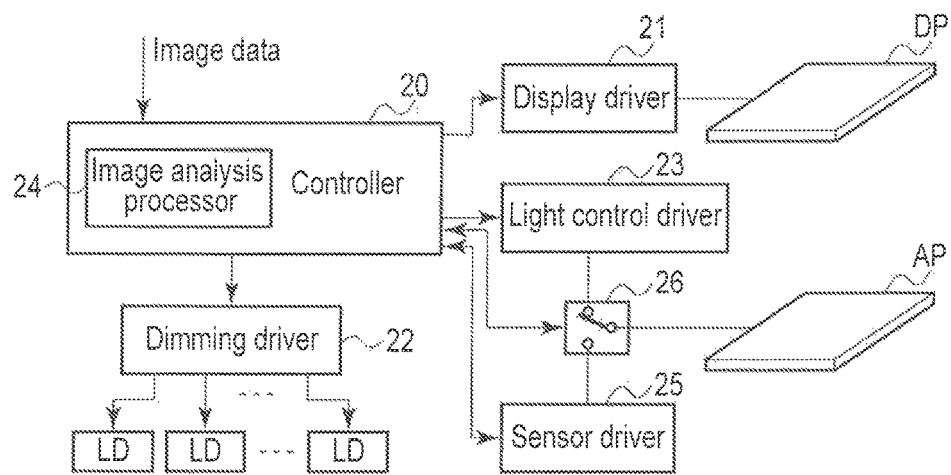
FIG. 11 is a block diagram schematically showing some of control elements provided in a display device according to the seventh embodiment.

FIG. 11 is a block diagram schematically showing some of control elements provided in the display device 1 according to the present embodiment. In addition to the control elements shown in FIG. 2, the display device 1 comprises a sensor driver 25 and a selector 26. For example, the sensor driver 25 and the selector 26 are formed as built-in circuits in the dimming panel AP. The sensor driver 25 and the selector 26 may be formed outside the dimming panel AP.

The sensor driver 25 drives the dimming panel AP at the time of sensing an object which contacts or is close to the display area A. For example, when the above mutual capacitance type of sensing is realized, the sensor driver 25 supplies a drive signal Stx to each first electrode E1, reads a detection signal Srx from each second electrode E2 and outputs the value shown by the detection signal Srx to a controller 20. When the above self-capacitance type of sensing is realized, the sensor driver 25 supplies a drive signal Stx to each second electrode E2, reads a detection signal Srx from each second electrode E2 and outputs the value shown by the detection signal Srx to the controller 20. The controller 20 detects (calculates) the presence or absence of an object which contacts or is close to the display device 1 and the position of the object based on the value input from the sensor driver 25.

The selector 26 selectively switches the connection destination of the dimming panel AP between a dimming driver 23 and the sensor driver 25 under the control of the controller 20.

Figure 12:
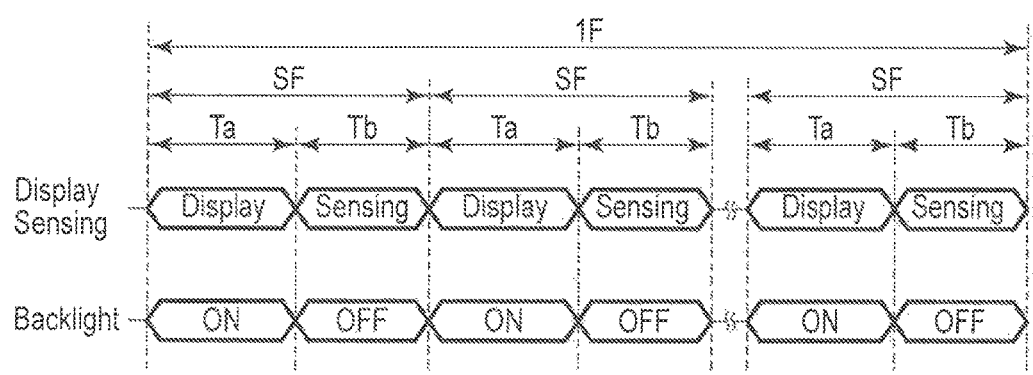
FIG. 12 is a timing chart showing an example of an operation related to display and sensing.

The controller 20 repeatedly executes an operation related to display and sensing while controlling the selector 26 and arbitrarily switching the connection destination of the dimming panel AP. FIG. 12 is a timing chart showing an example of an operation related to display and sensing. A sub-frame period SF (unit period) equivalent to one cycle of an operation related to display and sensing includes a display period Ta and a sensing period Tb, and is repeated in a time-series manner. A predetermined number of consecutive sub-frame periods SF constitute a frame period F for displaying an image for one frame.

In the display period Ta, the dimming driver 23 and the dimming panel AP are connected by the selector 26 in order to execute the control of the transmittance explained in the first to sixth embodiments. In the sensing period Tb, the sensor driver 25 and the dimming panel AP are connected by the selector 26 in order to execute the control related to a mutual capacitance method or self-capacitance method of sensing.

A backlight BL is controlled so as to be turned on in the display period Ta. In the display period Ta, each light-emitting diode LD is turned on with the luminance determined based on image data as explained in the first to sixth embodiments.

On the other hand, the backlight BL is controlled so as to be turned off in the sensing period Tb. In the sensing period Tb, all of the light-emitting diodes LD are turned off. In this manner, it is possible to prevent image disturbance caused by unintended transmittance change in the dimming area B because of a drive signal Stx supplied to the dimming panel AP in the sensing period Tb.

When the dimming panel AP is used as a sensor device as explained in the present embodiment, an object can be sensed without combining a separate sensor device with the display device 1. Further, The display device 1 can be made thinner compared with a case where a separate sensor device is combined with the display device 1.

Eighth Embodiment

Figure 13:
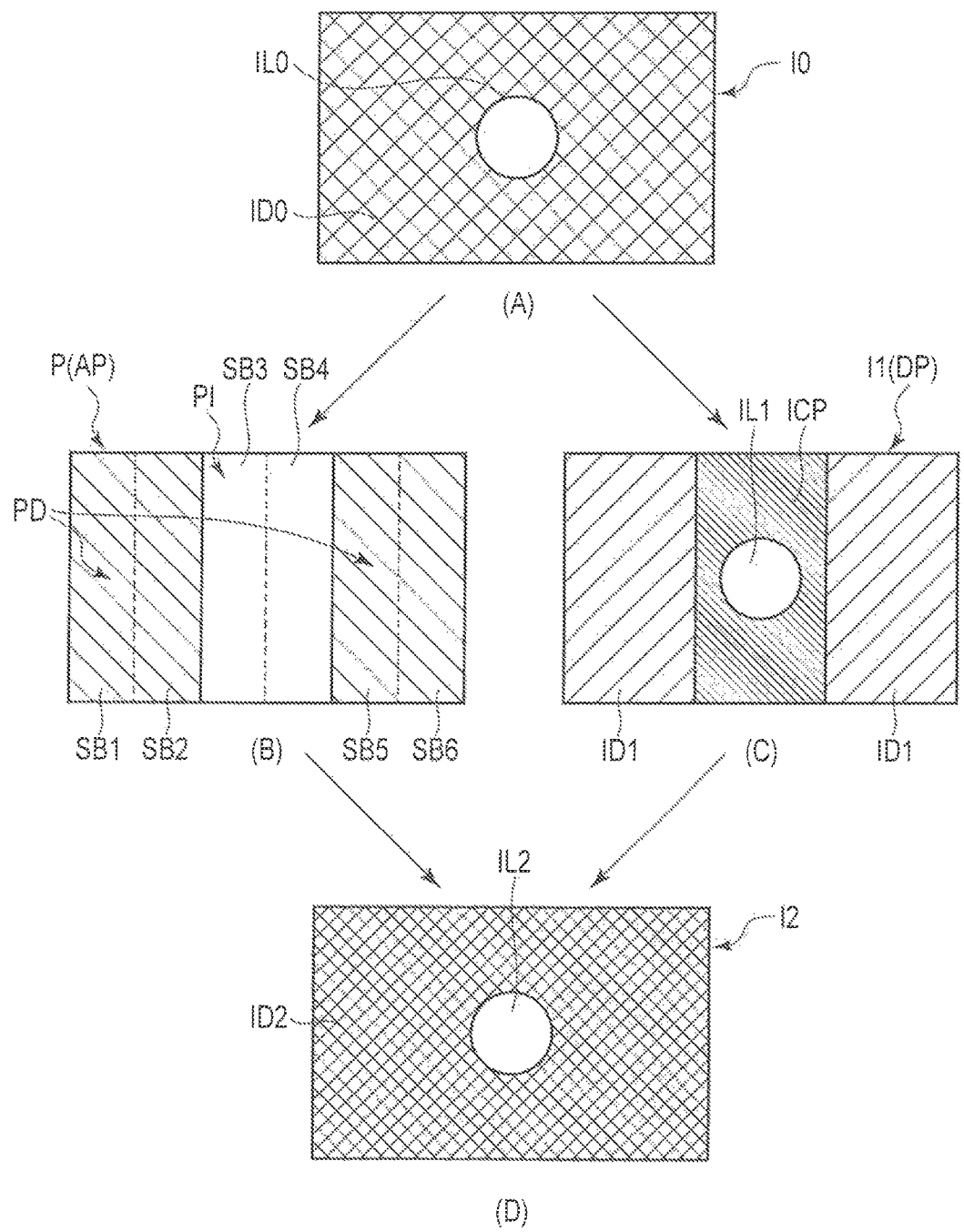
FIG. 13 shows an example of an image display method according to an eighth embodiment.

An eighth embodiment is an example of an image display method applicable to the display device 1 having the structure shown in FIG. 3. The eighth embodiment is explained with reference to FIG. 13.

FIG. 13(A) shows an original image I0 shown by image data received by a controller 20. The original image I0 includes a first dark portion ID0 and a first bright portion IL0. The luminance (or brightness) of the first dark portion ID0 is relatively low. The first bright portion IL0 is adjacent to the first dark portion ID0. The luminance (or brightness) of the first bright portion IL0 is higher than that of the first dark portion ID0.

FIG. 13(B) shows a dimming pattern P formed by the controller 20 in a dimming area B of a dimming panel AP based on the image data of the original image I0. The dimming pattern P includes a dark pattern PD formed in a region corresponding to the first dark portion ID0 of the original image I0, and a bright pattern PI whose light transmittance (or luminance) is higher than that of the dark pattern PD. The size of sub-areas SB1 to SB6 is larger than that of display pixels PXa of a display panel DP. Therefore, the resolution of the dimming panel AP is lower than that of the display panel DP. The bright pattern PI includes a region corresponding to the first bright portion IL0 of the original image I0 and is formed in a range wider than the region.

In the example of FIG. 13(B), the bright pattern PI is formed by sub-areas SB3 and SB4. Two dark patterns PD are formed by sub-areas SB1 and SB2 and sub-areas SB5 and SB6 so as to interpose the bright pattern PI.

FIG. 13(C) shows a display image I1 displayed by the controller 20 on the display panel DP based on the image data of the original image I0. The display image I1 includes a second bright portion IL1 displayed in a region corresponding to the first bright portion IL0 of the original image I0, and a second dark portion ID1 displayed in a region corresponding to each dark pattern PD of the dimming pattern P. In the examples shown here, the display image I1 comprises a complementary portion ICP between the second bright portion IL1 and the second dark portions ID1. The transmittance (or luminance) of the second bright portion IL1 is set such that the light transmitted through the bright pattern PI is displayed with a luminance substantially equal to that of the first bright portion IL0 of the original image I0. The transmittance (or luminance) of the second dark portions ID1 is set such that the light transmitted through the dark patterns PD is displayed with a luminance substantially equal to that of the first dark portion ID0 of the original image I0.

The complementary portion ICP has a shape in which the second bright portion IL1 is excluded from the region corresponding to the bright pattern PI. The transmittance (or luminance) of the complementary portion ICP is set such that the light transmitted through the bright pattern PI is displayed with a luminance substantially equal to the first dark portion ID0 of the original image I0. The luminance of the region in which the bright pattern PI overlaps the complementary portion ICP needs to be substantially equal to that of the region in which the dark patterns PD overlap the second dark portions ID1. Thus, the transmittance of the complementary portion ICP is lower than that of the second dark portions ID1.

FIG. 13(D) shows a display image I2 formed in a display area A by the combination of the dimming pattern P and the display image I1. The display image I2 includes a third bright portion IL2 corresponding to the first bright portion IL0 of the original image I0, and a third dark portion ID2 corresponding to the first dark portion ID0 of the original image I0. The third bright portion IL2 is displayed through the bright pattern PI of the dimming pattern P and the second bright portion IL1 of the display image I1. In this way, the third bright portion IL2 is displayed with a relatively high luminance. On the other hand, a large part of the third dark portion ID2 is displayed through the dark patterns PD of the dimming pattern P and the second dark portions ID1 of the display image I1. At this time, the dark patterns PD of the dimming pattern P appropriately block the light from the light guide LG. Thus, the amount of light transmitted through the dark patterns PD is sufficiently reduced. In this way, the luminance of the third dark portion ID2 formed by overlapping the dark patterns PD with the second dark portions ID1 is sufficiently low.

In the bright pattern PI, the region which does not overlap the second bright portion IL1 overlaps the complementary portion ICP. Thus, the luminance of this region is low so as to be substantially equal to that of the region in which the dark patterns PD overlap the second dark portions ID1.

The use of the image display method of the present embodiment enables the contrast of the display image to be finely adjusted even when the resolution of the dimming panel AP is lower than that of the display panel DP as set in the display device 1 of FIG. 3. It is difficult to form a bright pattern corresponding to the first bright portion IL0 of the original image I0 by sub-areas SB1 to SB6. However, the formation of the complementary portion ICP in the display image I1 enables the luminance to be adjusted in accordance with the outline of the first bright portion IL0.

Ninth Embodiment

A ninth embodiment is an example of an image display method applicable to the display device 1 having the structure shown in FIG. 4. The ninth embodiment is explained with reference to FIG. 14.

FIG. 14(A) shows an original image I0 shown by image data received by a controller 20. The original image I0 includes a first dark portion ID0 and a first bright portion IL0 as is the case with FIG. 13(A).

FIG. 14(B) shows a dimming pattern P formed by the controller 20 in a dimming area B of a dimming panel AP based on the image data of the original image I0. The dimming pattern P includes a dark pattern PD and a bright pattern PI as is the case with FIG. 13(B). The size of sub-areas SB11 to SB68 is larger than that of display pixels PXa of a display panel DP. Therefore, the resolution of the dimming panel AP is lower than that of the display panel DP. The bright pattern PI includes a region corresponding to the first bright portion IL0 of the original image I0 and is formed in a range wider than the region.

In the example of FIG. 14(B), the bright pattern PI is formed by sub-areas SB33 to SB36 and SB43 to SB46. The dark pattern PD is formed by the other sub-areas so as to surround the bright pattern PI.

FIG. 14(C) shows a display image I1 displayed by the controller 20 on the display panel DP based on the image data of the original image I0. As is the case with FIG. 13(C), the display image I1 includes a second bright portion IL1 displayed in a region corresponding to the first bright portion IL0 of the original image I0, a second dark portion ID1 displayed in a region corresponding to the dark pattern PD of the dimming pattern P, and a complementary portion ICP displayed between the second bright portion IL1 and the second dark portion ID1. Here, the complementary portion ICP is rectangular so as to surround the second bright portion IL1. The second dark portion ID1 surrounds the complementary portion ICP.

FIG. 14(D) shows a display image I2 formed in a display area A by the combination of the dimming pattern P and the display image I1. The display image I2 includes a third bright portion IL2 and a third dark portion ID2 as is the case with FIG. 13(D). The third bright portion IL2 is displayed through the bright pattern PI of the dimming pattern P and the second bright portion IL1 of the display image I1. Thus, the third bright portion IL2 is displayed with a relatively high luminance. On the other hand, the third dark portion ID2 is displayed through the dark pattern PD of the dimming pattern P and the second dark portion ID1 of the display image I1, or the bright pattern PI of the dimming pattern P and the complementary portion ICP of the display image I1. Thus, the luminance of the third dark portion ID2 is sufficiently low.

The use of the image display method of the present embodiment enables the contrast of the display image to be finely adjusted even when the resolution of the dimming panel AP is lower than that of the display panel DP as set in the display device 1 of FIG. 4. It is difficult to form a bright pattern corresponding to the first bright portion IL0 of the original image I0 by sub-areas SB11 to SB68. However, the formation of the complementary portion ICP in the display image I1 enables the luminance to be adjusted in accordance with the outline of the first bright portion IL0.

Tenth Embodiment

Figure 15:
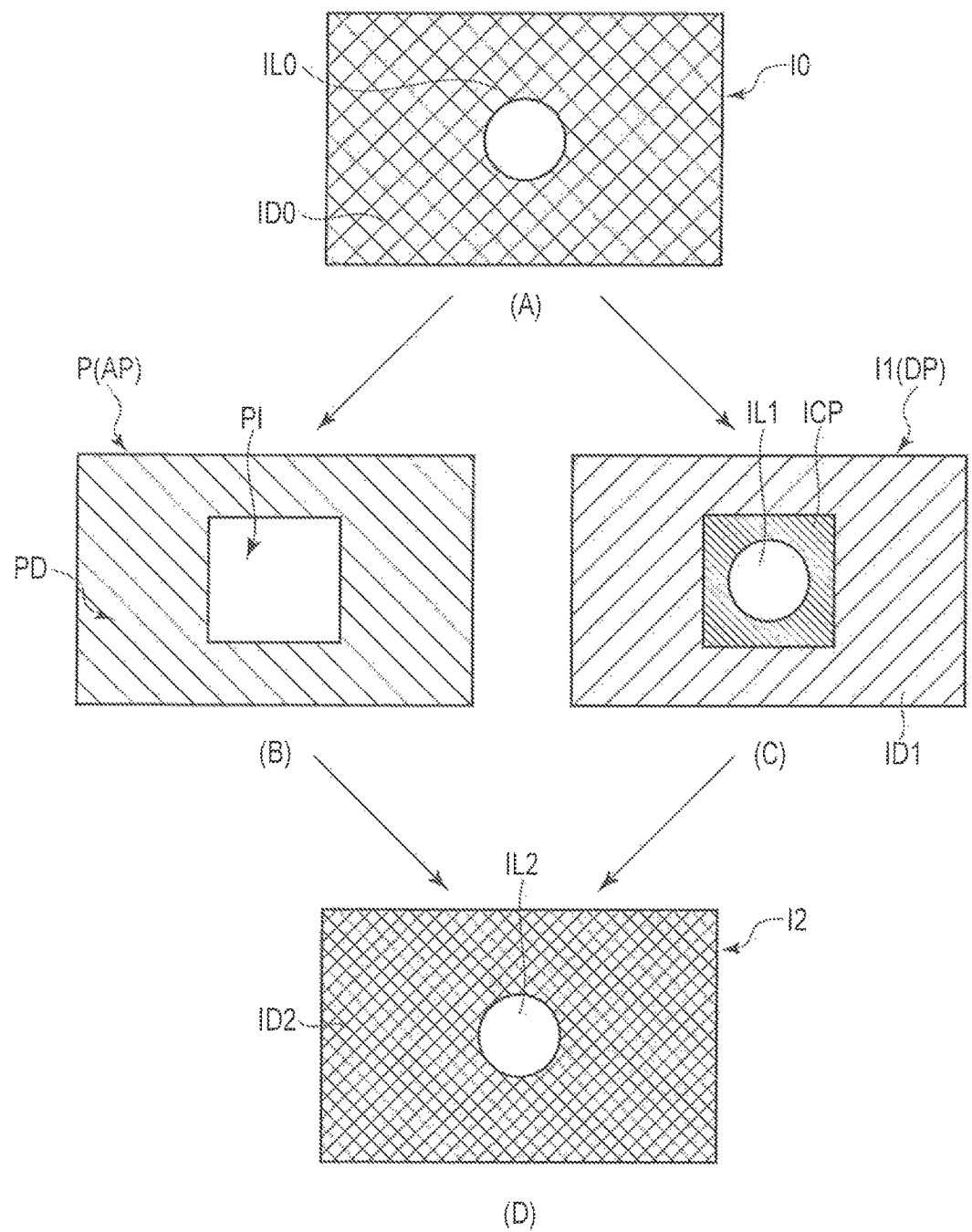
FIG. 15 shows an example of an image display method according to a tenth embodiment.

A tenth embodiment is an example of an image display method applicable to the display device 1 having the structure shown in FIG. 5. The tenth embodiment is explained with reference to FIG. 15.

FIG. 15(A) shows an original image I0 shown by image data received by a controller 20. The original image I0 includes a first dark portion ID0 and a first bright portion IL0 as is the case with FIG. 14(A).

FIG. 15(B) shows a dimming pattern P formed by the controller 20 in a dimming area B of a dimming panel AP based on the image data of the original image I0. The dimming pattern P includes a dark pattern PD and a bright pattern PI as is the case with FIG. 14(B). The bright pattern PI includes a region corresponding to the first bright portion IL0 of the original image I0 and is formed in a range wider than the region.

FIG. 15(C) shows a display image I1 displayed by the controller 20 on a display panel DP based on the image data of the original image I0. As is the case with FIG. 14(C), the display image I1 includes a second bright portion IL1 displayed in a region corresponding to the first bright portion IL0 of the original image I0, a second dark portion ID1 displayed in a region corresponding to the dark pattern PD of the dimming pattern P, and a complementary portion ICP displayed between the second bright portion IL1 and the second dark portion ID1.

FIG. 15(D) shows a display image I2 formed in a display area A by the combination of the dimming pattern P and the display image I1. The display image I2 includes a third bright portion IL2 and a third dark portion ID2 as is the case with FIG. 14(D). The third bright portion IL2 is displayed through the bright pattern PI of the dimming pattern P and the second bright portion IL1 of the display image I1. Thus, the third bright portion IL2 is displayed with a relatively high luminance. On the other hand, the third dark portion ID2 is displayed through the dark pattern PD of the dimming pattern P and the second dark portion ID1 of the display image I1, or the bright pattern PI of the dimming pattern P and the complementary portion ICP of the display image I1. Thus, the luminance of the third dark portion ID2 is sufficiently low.

The use of the image display method of the present embodiment enables the contrast of the display image to be finely adjusted even when, for example, the size of dimming pixels PXb is larger than that of display pixels PXa in the display device 1 of FIG. 5, and the bright pattern PI having the same shape as the first bright portion IL0 cannot be precisely formed on the dimming pattern P.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

The structures of the first to tenth embodiments can be appropriately modified. For example, as described above, the position of the display panel DP may be replaced by that of the dimming panel AP. In this case, no electronic shielding object is provided on the dimming panel AP. Thus, it is possible to enhance the sensitivity of sensing explained in the seventh embodiment.

In the eighth to tenth embodiments, the dimming pattern P is formed on the dimming panel AP so as to include the bright pattern PI and the dark pattern PD. However, the dimming pattern P may be formed such that the luminance is changed in more stages. For example, the dimming pattern P may be formed such that the luminance becomes lower in stages with increasing distance from the region corresponding to the first bright portion IL0 of the original image 10. Moreover, the transmittance may be changed in stages corresponding to the gradual change in the luminance of the dimming pattern P in the display image I1.

Some examples of display devices to be obtained from the structures disclosed in the specification of the present application are additionally described below.

[1] A display device comprising:
a light source;
a light guide comprising an entrance surface facing the light source, and an exit surface from which light incident on the entrance surface exits;
a display panel comprising a display area in which a plurality of display pixels are arranged, the display area facing the exit surface, the display panel configured to selectively transmit light incident on the display area for displaying an image in the display area by driving the display pixels; and
a dimming panel comprising a dimming area facing the display area and the exit surface, the dimming panel configured to change a transmittance of light incident on the dimming area for each portion in the dimming area.

[2] The display device of the above example [1], wherein
the dimming panel is provided between the display panel and the light guide, and, is configured to change a transmittance of light which exits from the exit surface and enters the dimming area toward the display panel for each portion in the dimming area, and
the display panel is configured to selectively transmit light, which is transmitted through the dimming panel and enters the display area, by driving the display pixels for displaying an image in the display area.

[3] The display device of the above example [1], wherein
the dimming area comprises a plurality of sub-areas which extend in a band shape in a first direction and are arranged in a second direction intersecting with the first direction, and
the dimming panel is configured to change the transmittance of the light incident on the dimming area for each of the sub-areas.

[4] The display device of the above example [3], wherein
the entrance surface extends in the first direction, and
the plurality of light sources are arranged along the entrance surface, and are separately adjustable in luminance thereof.

[5] The display device of the above example [4], wherein
light from a high-luminance region of the exit surface of the light guide enters the dimming area, the high-luminance region having a high luminance by light from a lit light source of the light sources, and
the dimming panel is configured to change a light transmittance for each portion of a region which light from the high-luminance region enters in the dimming area.

[6] The display device of the above example [1], wherein
the dimming area comprises a plurality of sub-areas arranged in a matrix state in a first direction and a second direction intersecting with the first direction, and
the dimming panel is configured to change the transmittance of the light incident on the dimming area for each of the sub-areas.

[7] The display device of the above example [1], wherein
the dimming area comprises a plurality of dimming pixels arranged in a matrix state in a first direction and a second direction intersecting with the first direction, and
the dimming panel is configured to change the transmittance of the light incident on the dimming area for each of the dimming pixels.

[8] The display device of the above example [1], wherein
each of the display panel and the dimming panel is a liquid crystal panel comprising a pair of substrates and a liquid crystal layer interposed between the substrates,
a first polarizer and a second polarizer are provided to interpose the dimming panel therebetween,
a third polarizer is provided to interpose the display panel with the second polarizer,
the first polarizer and the third polarizer comprise a first polarizing axis, and
the second polarizer comprises a second polarizing axis orthogonal to the first polarizing axis.

[9] The display device of the above example [1], wherein
the dimming panel is a liquid crystal panel comprising:
a pair of substrates;
a liquid crystal layer sealed between the substrates;
a first electrode provided on one of the substrates; and
a second electrode, provided on one of the substrates, facing the first electrode, and the display device further comprises a controller configured to:

display an image in the display area by controlling the display panel and control a transmittance of the dimming area by controlling voltage applied between the first electrode and the second electrode in a first period; and detect an object which contacts or is close to the display area based on a detection signal obtained from one of the first electrode and the second electrode in a second period different from the first period.

[10] The display device of the above example [9], wherein the controller is configured to turn the light source off in the second period.

[11] The display device of the above example [1], wherein when an image including a first dark portion and a first bright portion which is adjacent to the first dark portion and has a luminance higher than the first dark portion is displayed in the display area, the dimming panel is configured to set a light transmittance in an area which includes a region corresponding to the first bright portion and which is wider than the region, so as to be higher than a light transmittance in a surrounding region in the dimming area.

[12] The display device of the above example [11], wherein in the dimming area, the dimming panel is configured to form a dark pattern in a region corresponding to the first dark portion, and to form a bright pattern whose light transmittance is higher than the dark pattern in an area which includes a region corresponding to the first bright portion and which is wider than the region, and in the display area, the display panel is configured to display a second dark portion in a region corresponding to the dark pattern, to display a second bright portion whose light transmittance is higher than the second dark portion in a region corresponding to the first bright portion, and to display a complementary portion between the second dark portion and the second bright portion wherein a light transmittance in the complementary portion is lower than the second dark portion.

What is claimed is:

1. A display device comprising:
   a light source;
   a light guide comprising an entrance surface facing the light source, and an exit surface from which light incident on the entrance surface exits;
   a display panel comprising a display area in which a plurality of display pixels are arranged, the display area facing the exit surface, the display panel configured to selectively transmit light incident on the display area for displaying an image in the display area by driving the display pixels; and
   a dimming panel comprising a dimming area facing the display area and the exit surface, the dimming panel configured to change a transmittance of light incident on the dimming area for each portion in the dimming area, wherein
   when an image including a first dark portion and a first bright portion which is adjacent to the first dark portion and has a luminance higher than that the first dark portion is displayed in the display area,
   the dimming panel is configured to set a light transmittance in an area which includes a region corresponding to the first bright portion and which is wider than the region, so as to be higher than a light transmittance in a surrounding region in the dimming area,
   in the dimming area, the dimming panel is configured to form a dark pattern in a region corresponding to the first dark portion, and to form a bright pattern whose light transmittance is higher than the dark pattern in the area which includes the region corresponding to the first bright portion and which is wider than the region, and
   in the display area, the display panel is configured to display a second dark portion in a region corresponding to the dark pattern, to display a second bright portion whose light transmittance is higher than the second dark portion in a region corresponding to the first bright portion, and to display a complementary portion between the second dark portion and the second bright portion wherein a light transmittance in the complementary portion is lower than the second dark portion.

2. The display device according to claim 1, wherein
the dimming panel is provided between the display panel and the light guide, and, is configured to change a transmittance of light which exits from the exit surface and enters the dimming area toward the display panel for each portion in the dimming area, and
the display panel is configured to selectively transmit light, which is transmitted through the dimming panel and enters the display area, by driving the display pixels for displaying an image in the display area.

3. The display device according to claim 1, wherein
the dimming area comprises a plurality of sub-areas which extend in a band shape in a first direction and are arranged in a second direction intersecting with the first direction, and
the dimming panel is configured to change the transmittance of the light incident on the dimming area for each of the sub-areas.

4. The display device according to claim 3, wherein
the entrance surface extends in the first direction, and
the light source is one of a plurality of light sources that are arranged along the entrance surface, and are separately adjustable in luminance thereof.

5. The display device according to claim 4, wherein
light from a high-luminance region of the exit surface of the light guide enters the dimming area, the high-luminance region having a high luminance by light from a lit light source of the light sources, and
the dimming panel is configured to change a light transmittance for each portion of a region which light from the high-luminance region enters in the dimming area.

6. The display device according to claim 1, wherein
the dimming area comprises a plurality of sub-areas arranged in a matrix state in a first direction and a second direction intersecting with the first direction, and
the dimming panel is configured to change the transmittance of the light incident on the dimming area for each of the sub-areas.

7. The display device according to claim 1, wherein
the dimming area comprises a plurality of dimming pixels arranged in a matrix state in a first direction and a second direction intersecting with the first direction, and
the dimming panel is configured to change the transmittance of the light incident on the dimming area for each of the dimming pixels.

8. The display device according to claim 1, wherein
each of the display panel and the dimming panel is a liquid crystal panel comprising a pair of substrates and a liquid crystal layer interposed between the substrates, a first polarizer and a second polarizer are provided to interpose the dimming panel therebetween, a third polarizer is provided to interpose the display panel with the second polarizer, the first polarizer and the third polarizer comprise a first polarizing axis, and the second polarizer comprises a second polarizing axis orthogonal to the first polarizing axis.

9. The display device according to claim 1, wherein the dimming panel is a liquid crystal panel comprising:

a pair of substrates; a liquid crystal layer sealed between the substrates;

a first electrode provided on one of the substrates; and a second electrode, provided on one of the substrates, facing the first electrode, and the display device further comprises a controller configured to:

display an image in the display area by controlling the display panel and control a transmittance of the dimming area by controlling voltage applied between the first electrode and the second electrode in a first period; and detect an object which contacts or is close to the display area based on a detection signal obtained from one of the first electrode and the second electrode in a second period different from the first period.

10. The display device according to claim 9, wherein the controller is configured to turn the light source off in the second period.

\* \* \* \* \*